United States Patent [19]

Marelli

[11] Patent Number: 4,960,230

[45] Date of Patent: Oct. 2, 1990

[54] DELIVERY PUMP FOR FLUID CONTAINERS

[75] Inventor: Luciano Marelli, Rozzano, Italy

[73] Assignee: Elettro Plastica S.R.L., Milan, Italy

[21] Appl. No.: 297,125

[22] Filed: Jan. 17, 1989

[30] Foreign Application Priority Data

Jul. 30, 1987 [IT] Italy ............................. 22133/87[U]

[51] Int. Cl.$^5$ ............................................ G01F 11/02

[52] U.S. Cl. .................................... 222/321; 222/385; 222/341

[58] Field of Search ............... 222/309, 321, 340, 341, 222/383, 385; 239/333

[56] References Cited

U.S. PATENT DOCUMENTS

| | | | |
|---|---|---|---|
| 3,583,605 | 6/1971 | Corsette | 222/321 |
| 4,155,489 | 5/1979 | Steiman | 222/321 |
| 4,228,931 | 10/1980 | Ruscitti et al. | 222/321 |
| 4,252,507 | 2/1981 | Knickerbocker | 417/444 |
| 4,433,799 | 2/1984 | Corsette | 222/309 |
| 4,434,916 | 3/1984 | Ruscitti et al. | 222/321 |
| 4,607,765 | 8/1986 | Ruscitti | 222/321 |

*Primary Examiner*—Michael S. Huppert
*Attorney, Agent, or Firm*—Shlesinger, Fitzsimmons & Shlesinger

[57] ABSTRACT

The pump comprises a chamber divided into a lower cavity occupied by the fluid and an upper cavity at atmospheric pressure. A flexible ring piston sealingly runs in the chamber and is inserted in a slidable way on a stem valve, with which it co-operates to enable or interrupt the outward flow of the fluid. The piston has a tapered section at its lower end, which engages by friction in a corresponding tapered groove of the stem valve to allow delivering of a fine mist with a very low delivery pressure also.

7 Claims, 3 Drawing Sheets

DELIVERY PUMP FOR FLUID CONTAINERS

The current invention refers to a delivery pump which can be applied to fluid containers.

Several types of delivery pumps are available for fluids which can spray or distribute a certain quantity of product (perfumes, medicinal substances, fluid soap and such like) contained in the pump chamber.

A pump of this type is constituted substantially by a hollow cylinder, forming the pump chamber, in which a flexible ring piston sealingly moves which is inserted in a slidable way on a stem valve and co-operates with the same for opening and closing a flow duct within the valve, said duct communicating with a delivery mouth equipped with a nozzle or spout.

The sealing piston divides the pump chamber into two cavities, a lower cavity containing the fluid and an upper cavity containing air at atmospheric pressure. Said upper cavity is placed in communication with the atmosphere each time the pump is activated and air arrives inside the container to restore atmospheric pressure inside it.

The pump chamber has at its lower end a pipe which is immersed in the liquid and whose mouth has movable closing means. Said pump chamber has one or more return springs which return both the valve and the hollow piston to the rest position when the operating pushbutton is no longer pressed.

In this type of pump it is important to avoid that a very low delivery pressure causes the pump to deliver the product in large drops rather than in a fine mist.

The object of the present invention is thus to accomplish a delivery pump for fluid containers, in which a suitable solution of the above said problem is included.

According to the invention, said object is attained by a delivery pump for fluid containers, comprising a chamber divided into a lower cavity occupied by the fluid and an upper cavity at atmospheric pressure, in which chamber a flexible ring piston sealingly moves which is inserted in a slidable way on a stem valve and co-operates with the same to enable or interrupt the flow of the fluid to the outside of the container, characterized in that said piston has a tapered section at its lower end, which engages by friction in a corresponding tapered groove of said stem valve.

In this way, only when a suitable pressure has been formed in the pump chamber, the piston disengages from the sealing groove, thereby allowing the fluid to pass.

Preferably and according to another aspect of the present invention, the pump chamber is closed at its upper end by a flange provided with a deformable collar of variable length turned inwards and engageable with a portion of said valve to create a seal.

By utilizing collars of different lengths, it is thus possible to obtain a differentiated positioning of the corresponding valve within the pump chamber and as a consequence the volume of the upper and lower cavities occupied by air and fluid respectively will be modified. In other words, in the case of a flange with a short collar, the valve will be in a position at some distance from the bottom of the pump chamber, and thus the cavity occupied by air will have a limited volume while the cavity occupied by the fluid will have an increased volume; while on the other hand, in the case of a flange with a long collar, the valve will be in a position close to the bottom of the pump chamber, and thus the cavity occupied by air will have an increased volume while the cavity occupied by the fluid will have a reduced volume. The sum total of the two volumes will always be equal to the constant net volume of the chamber.

In the final analysis, the pump chamber is dimensioned in relation to a maximum quantity to be delivered and a certain number of chambers is equipped with collars having different lengths starting with a minimum length corresponding to the largest quantity to be delivered up to a maximum length of the collar which will correspond to the smallest quantity, thus obtaining a series of pumps for a wide range of delivered quantities.

The flange consists of deformable material and is used as a seal against the neck of the container of fluid so that a further advantage is the elimination of an additional seal.

A possible embodiment of the present invention is illustrated, as a non-limiting example, in the enclosed drawings, in which.

Figure 1:
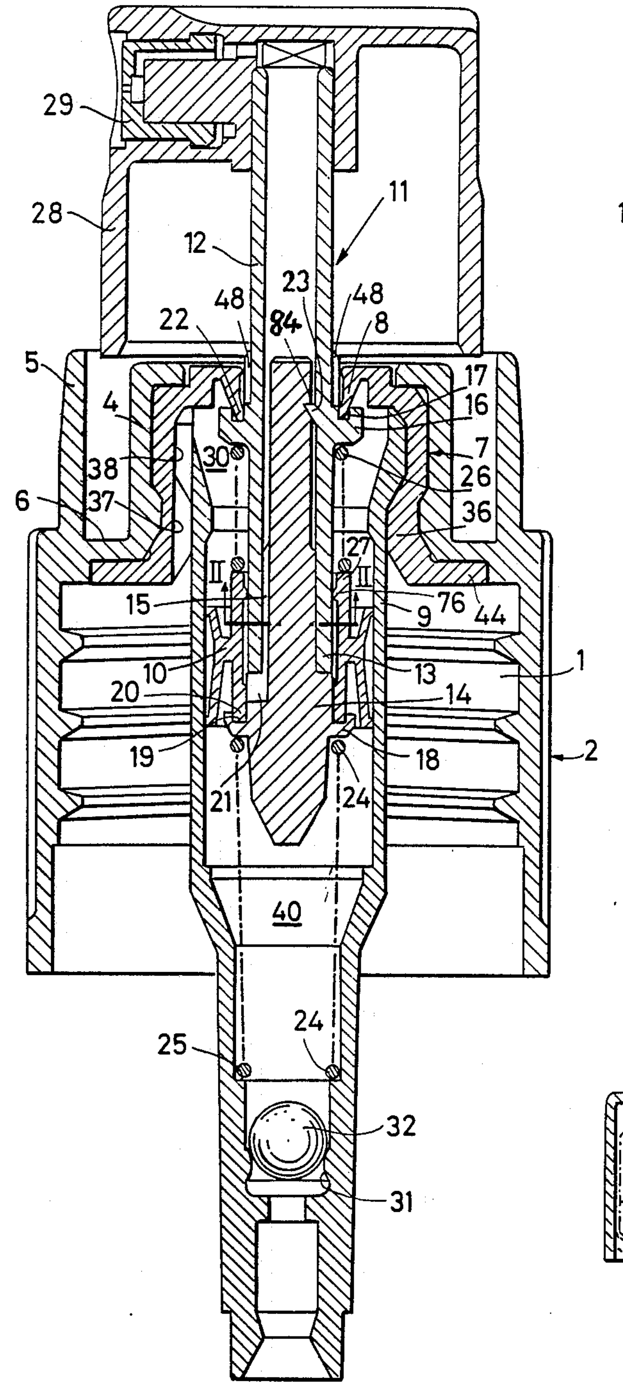
FIG. 1 shows a delivery pump according to the invention, in a cross-section along a vertical plane.
Figure 2:
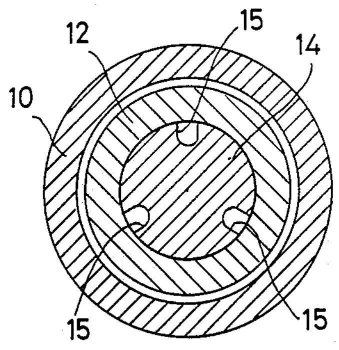
FIG. 2 shows a cross-section along the line II—II of FIG. 1.

With reference to FIG. 1, a delivery pump is shown which can be applied to the threaded neck of a container of fluid. The pump is screwed on to said neck by means of a locking ring nut 2 with an upper crown formed by a pair of walls 4 and 5 which define a deep ring groove 6.

Inside the internal wall 4 of said ring nut 2 a flange 7 is compressed, which has a collar 8 of variable length turned inwards toward the flange itself and whose object will be clarified later. Inside the flange 7 a hollow cylinder 9 is held constituting the pump chamber, inside which there is a flexible sealingly slidable ring piston 10. In turn, inside said piston 10, a stem valve 11 can also sealingly slide consisting of a tubular portion 12 whose bottom 13 is partially closed by a shaped casing 14 inserted in said portion 12 and forming ducts 15 with it for the passage of the fluid to be delivered.

Said piston 10, being connected in an airtight way with the hollow cylinder 9 and, thanks to an internal ring 76, with the valve 11, divides the pump chamber into an upper cavity 30 containing air at atmospheric pressure and a lower cavity 40 containing the quantity of fluid to be delivered with one operation of the pump.

Said tubular portion 12 is provided, in its central part, with a first projection 16 which defines a first ring groove 17 within which the free end 22 of the collar 8 is inserted to obtain a seal and, in its lower part, with a second projection 18 which defines a second ring groove 19 within which the lower end 20 of said piston 10 is inserted in an airtight way.

Between the bottom 13 of the tubular portion 12 and the shaped casing 14, and just above said second projection 18, there are three inlets 21 arranged at 120° to one another, which communicate with said ducts 15 (FIG.

2) obtained along the peripheral area of said shaped casing 14. The latter is restrained within the tubular portion 12 due to the engagement between pawls 23 protruding from the walls of the tubular portion itself and corresponding notches 84 in the upper end of said casing 14 whereby casing 14 operatively forms a portion of valve 11.

The valve 11 is kept in the rest position shown in FIG. 1 by means of a return spring 24 whose ends react on the second projection 18 of the tubular portion 12 and on a seat 25 in the lower part of the hollow cylinder 9, respectively.

A further return spring 26, whose ends react on the first projection 16 and on the upper end 27 of the piston 10 respectively, returns said piston 10 to the position of closure of the inlets 21, accomplishing a seal in the second groove 19. A cap 28 with a nozzle 29 is inserted in the upper part of said tubular portion 12.

At the lower end of the pump chamber there is a throat 31, communicating with a pipe immersed in the fluid (not shown), closed by a ball 32.

Figure 3:
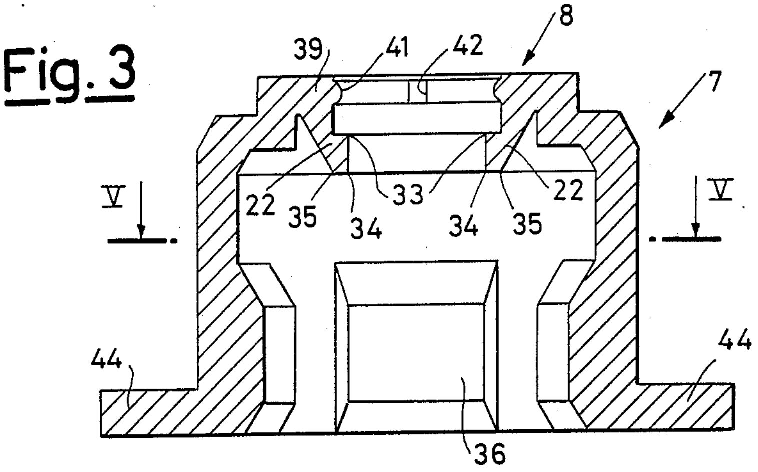
FIG. 3 shows a cross-section along a vertical plane of a flange with a short collar used in the above pump.
Figure 4:
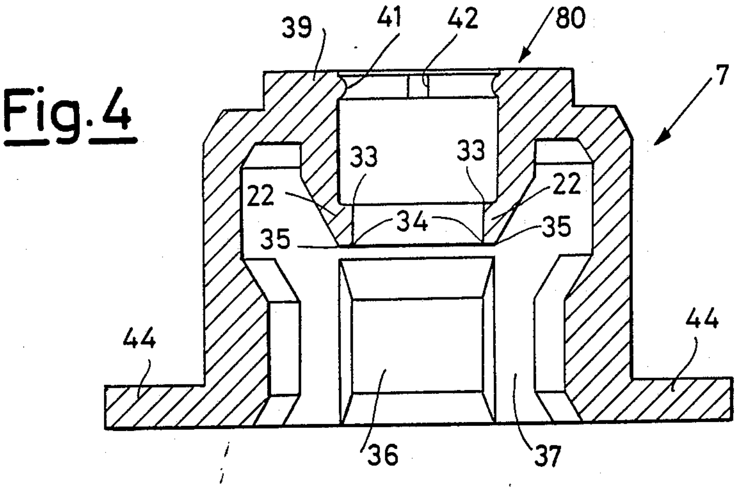
FIG. 4 shows a cross-section along a vertical plane of a flange with a long collar used as an alternative to the flange of FIG. 3.
Figure 5:
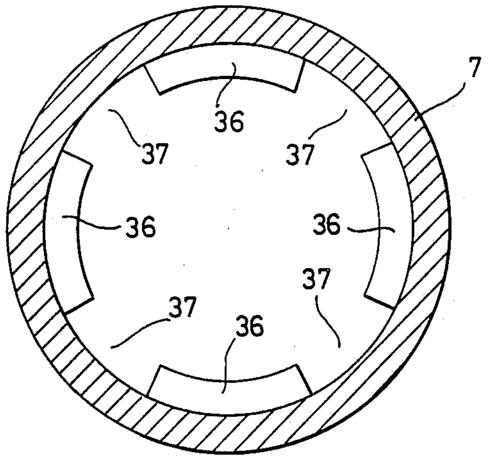
FIG. 5 shows a cross-section along the line V—V of FIG. 3.

The flange 7 is shown in greater detail in FIGS. 3, 4 and 5.

FIG. 3 shows a flange 7 with a short collar 8 which in combination with the valve 11 as described can effect the delivery of a larger quantity of fluid.

FIG. 4 shows a flange 7 with a long collar 80 which in combination with the valve 11 as described can effect the delivery of a smaller quantity of fluid. As can be seen, the terminal part 22 of the collars 8 and 80 is equipped with sharp edges 33, 34 and 35, each of which forms an airtight sealing point within the first ring groove 17.

The flange 7, along part of the connecting surface with the hollow cylinder 9, has projecting sectors 36 separated one from the other by passages 37 (FIG. 5) for the flow of air arriving from the outside, said passages 37 being also provided at further openings 38 in the upper end of the hollow cylinder 9. Air flows from the outside through short passages 48 (FIG. 1) which are provided along the external surface of the tubular portion 12.

The upper part 39 of the collar has a projecting ring 41 with openings 42 which guarantee the flow of air to the inside of the container for the entire stroke of the valve 11.

Said projecting ring 41, together with the end 22, thanks to the fact that the flange is compressed and is deformable, is constantly in contact with the external surface of the tubular portion 12 guaranteeing an airtight seal which in particular permits the use of the pump in an upturned position without any fluid being discharged.

Figure 6:
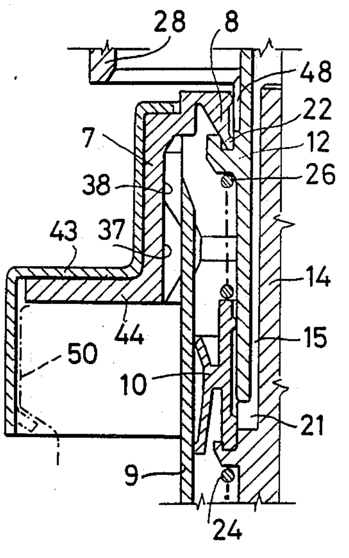
FIG. 6 shows a detail of a type of pump connection for a container with a non-threaded neck.

The described pump can be applied to any container, either if it has a threaded neck as shown in FIG. 1, or if it has a smooth neck. The flange 7 has a projecting edge 44 to seal the container's neck. In the case of the application to a container with a smooth neck 50 the pump is fastened by means of a metal ring 43 (FIG. 6) seamed along the lower edge of the neck itself.

The described pump operates as follows.

The pump is in the rest position illustrated in FIG. 1. When the cap 28 is pressed the valve 11 is lowered and compresses the fluid contained in the cavity 40 which, being incompressible, pushes the piston 10 upwards thus freeing the inlets 21 of the ducts 15. The fluid passes into the latter and then rises up within the tubular portion 12 and at last arrives at the nozzle 29. At the same time the collar 8 or 80 disengages itself from the groove 17 and, since the edges 33, 34 and 35 no longer provide an airtight seal, atmospheric air can flow through the short channels 48, the openings 38 and the passages 37 restoring atmospheric pressure within the container.

Once the quantity of fluid has been delivered and the pressure on the cap ceases, the valve 11 operated by the spring 24 returns to the rest position while the end 22 of the collar 8 or 80 restores the airtight seal and the inlets 21 are once again closed by the piston 10 under the action of the return spring 26. At the same time, as a result of the depression created in the cavity 40, the ball 32 is raised and the fluid in the container once again fills the chamber 40 by moving up the immersion pipe. When filling is complete the ball 32 once again closes the throat 31.

Figure 7:
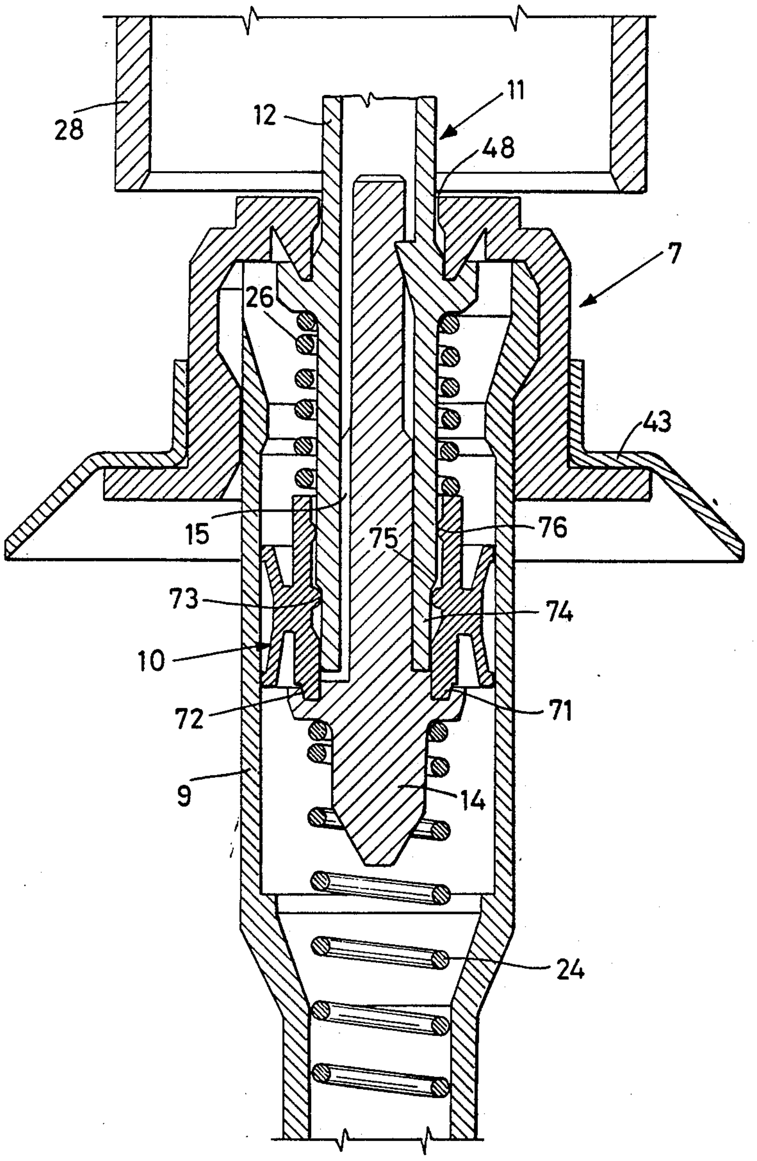
FIG. 7 shows a variation of the above pump, sectioned axially as in FIG. 1.

FIG. 7 illustrates a variation of the pump described above, which is different in that it has the following additional features:

(a) the piston 10 has a tapered section 71 at its lower end, which engages in a corresponding tapered groove 72 (about 10°) of the shaped casing 14 so that the piston may be lightly held in the groove itself, with the object of avoiding that with a very low delivery pressure the pump were to deliver the product in large drops instead of in a fine mist. As a result of the connection 71–72, only when the correct pressure has been created in the pump chamber, the piston 10 will thus disengage from the airtight cone 72 and allow the liquid to pass.

(b) In the internal section of the piston 10 there is a further seal ring 73, which, when the pump is mounted and at rest, positions itself on a portion with a smaller diameter 74 of the tubular stem 12 very close to the transition point 75 towards the portion with a larger diameter of same. When the pump is operated, the stem 12 is lowered and a seal under pressure of the ring 73 of the piston 10 on the larger diameter of the stem 12 is obtained, thus avoiding the passage of the liquid between the stem and the piston. When the pump returns to its rest position, the seal ring 73 of the piston 10 returns to its original diameter. In this way the seal ring 73 of the piston, forced by the stem 12, will not in time take on the exact dimension of the same, reducing the sealing characteristics.

What is claimed:

1. Delivery pump for a fluid container, comprising a pump chamber, a flexible ring piston sealingly axially movable in said chamber intermediate the ends thereof operatively to define therein a lower cavity for containing the fluid to be delivered and an upper cavity for containing air at atmospheric pressure, a stem valve coaxially movably arranged in said chamber and passing slidably through said piston to cooperate therewith selectively to open and close communication of said lower cavity with the outside of said container, first spring means arranged in said lower cavity for resiliently urging the stem valve to a rest position, second spring means arranged in said upper cavity and reacting against a projection formed on said stem valve adjacent the upper end thereof for resiliently urging said piston towards a lower, enlarged end of said stem valve to close said communication, said valve having a tapered groove formed in said enlarged end thereof to receive frictionally a corresponding tapered lower end portion of the piston when in closed position, said stem valve having thereon a body portion located between said projection and said enlarged end thereof and which includes an upper portion of major diameter and a lower portion of minor diameter, and said piston having an internal ring-shaped protuberance which cooperates with said valve body portion to engage said lower portion thereof at rest and said upper portion upon the opening movement of the valve.

2. Delivery pump according to claim 1, characterized in that said valve comprises a tubular section in which a shaped casing provided with said tapered groove is inserted, said shaped casing being further provided with ducts communicating with fluid inlets arranged between the bottom of said tubular section and said shaped casing.

3. Delivery pump according to claim 1, characterized in that said pump chamber is closed at its upper end by a flange provided with a deformable collar turned inwards and engageable with a cooperating portion of said valve to create a seal.

4. Delivery pump according to claim 3, characterized in that said flange is of a deformable material and has a projecting edge operative to create an airtight seal against the neck of the container on which the pump is mounted.

5. Delivery pump according to claim 3, characterized in that said deformable collar includes a terminal part with a plurality of edges, each of which forms an airtight seal with said cooperating portion of said valve.

6. Delivery pump according to claim 3, characterized in that said flange surrounds said valve and has formed therein projecting sectors separated one from the other by passages.

7. Delivery pump according to claim 3, characterized in that the upper part of the collar has a projecting ring in which there are formed therein air vent openings.

* * * * *